(12) United States Patent
Deckers

(10) Patent No.: US 6,550,905 B1
(45) Date of Patent: Apr. 22, 2003

(54) RADIATION CURABLE INKJET INK RELATIVELY FREE OF PHOTOINITIATOR AND METHOD AND APPARATUS OF CURING THE INK

(75) Inventor: Bernard J. Deckers, Vlezenbeek (BE)

(73) Assignee: Dotrix N.V., Ghent (BE)

( * ) Notice: Subject to any disclaimer, the term of this patent is extended or adjusted under 35 U.S.C. 154(b) by 0 days.

(21) Appl. No.: 10/015,218

(22) Filed: Nov. 19, 2001

(51) Int. Cl.$^7$ ................................ B41J 2/01; B41J 2/17

(52) U.S. Cl. ..................... 347/100; 347/102; 347/101; 347/96

(58) Field of Search ................................ 347/100, 102, 347/96, 101, 97, 34, 25

(56) References Cited

U.S. PATENT DOCUMENTS

| | | | | |
|---|---|---|---|---|
| 5,275,646 A | * | 1/1994 | Marshall et al. | 347/100 |
| 5,446,073 A | | 8/1995 | Jonsson et al. | 522/104 |
| 5,945,680 A | | 8/1999 | Jensen | 250/492.1 |
| 6,025,409 A | | 2/2000 | Jansen | 522/107 |
| 6,030,703 A | | 2/2000 | Fan et al. | 428/378 |
| 6,034,150 A | | 3/2000 | Hoyle et al. | 522/63 |
| 6,092,890 A | * | 7/2000 | Wen et al. | 347/101 |
| 6,114,406 A | * | 9/2000 | Caiger et al. | 522/121 |
| 6,127,447 A | | 10/2000 | Miltry et al. | 522/107 |
| 6,312,123 B1 | * | 11/2001 | Codos et al. | 347/102 |
| 6,390,618 B1 | * | 5/2002 | Wotton et al. | 347/102 |
| 6,443,569 B1 | * | 9/2002 | Mheidle et al. | 347/100 |

FOREIGN PATENT DOCUMENTS

| | | | | |
|---|---|---|---|---|
| WO | WO9628302 | 9/1996 | | B41F/23/04 |
| WO | WO0061999 | 10/2000 | | F26B/3/28 |

* cited by examiner

Primary Examiner—Lamson Nguyen
Assistant Examiner—Manish S. Shah
(74) Attorney, Agent, or Firm—Dov Rosenfeld Inventek

(57) ABSTRACT

A composition for a UV-curable inkjet ink that includes none or almost no photoinitiator, and a method of polymerizing one or more such inkjet inks having a viscosity and superficial tension suitable for inkjet printing. The UV curable inkjet ink includes 20–40% by weight of one or more monofunctional acrylates, 35–55% by weight of one or more difunctional acrylates, 5–15% by weight of one or more trifunctional acrylates, no more than approximately 5% by weight of one or more pigments; and a minute quantity or photoinitiator. One embodiment further includes 5–15% by weight of one or more highly reactive acrylates and 0.5–1.5% stabilizer. The method includes depositing the one or more inks on the substrate using one or more inkjet heads in an inkjet printer, irradiating the deposited inks with UV radiation relatively high in UVC radiation ("UVC-rich radiation"), the UVC-rich radiation produced by a first UV source, the irradiation while the substrate is moved relative to the first UV source. The method further includes depleting the region close to the substrate surface of oxygen such that the between region between the first UV source and the laid out inks is relatively free of oxygen during the irradiating to increase the amount of UVC reaching the inks and to reduce the lowering caused by oxygen of the effectiveness of any photoinitiator in the ink. The inks are relatively free of photoinitiator.

46 Claims, 2 Drawing Sheets

RADIATION CURABLE INKJET INK RELATIVELY FREE OF PHOTOINITIATOR AND METHOD AND APPARATUS OF CURING THE INK

BACKGROUND

The invention relates to inkjet inks relatively free of photoinitiator and to a method and apparatus for curing one or more such inkjet inks.

Inkjet printing is known wherein one or more inkjet inks are laid on to a substrate. It is also known to cure the inkjet inks using ultraviolet (UV), radiation, such radiation causing polymerization of the inks.

Inkjet inks typically require low viscosity. However, low viscosity typically leads to low reactivity. To increase the reactivity, one or more photoinitiators are often used in inkjet inks in concentrations typically between 5% and 10%. Photoinitiators are molecules that are excited by the UV radiation to form free radicals that start the polymerization process.

It is known that oxygen may interfere with any photoinitiated process. This is one reason UV curable inkjet inks typically contain a large amount of photoinitiator to enable them to be UV-cured in air. It is also known that the UV curing process can be improved by inertization of the curing environment, for example by spreading a blanket of relatively inert gas such as nitrogen. By relatively inert is meant inert compared to oxygen with respect to the inks, substrate and UV radiation The use of common photoinitiators has the disadvantage that residues of the photoinitiators included in the ink may migrate out of the coating after curing. This is disadvantageous because these migrated residues cause contamination of the environment. Most photoinitiators, for example, are classified as toxic substances. Inkjet inks that include such photoinitiators typically are not suitable for products with direct food contact.

There is thus a need in the art for inkjet inks that are free or relatively free of photoinitiator, and a process for curing such photoinitiator-free inks.

Several forms of inkjet printing are known. One form is drop-on-demand inkjet printing using one or more piezoelectric inkjet head. One form of such printing is multi-color printing wherein several inks are laid in sequence, with one ink possibly on top of one or more other inks. One form is wet-on-wet printing wherein all inks are laid in one pass prior to curing. Furthermore, grey-scale inkjet printing also is known wherein each ink is laid in varying quantity—e.g., varying drop size—to provide a grey-scale. Note that inkjet grey-scale printing is usually "pseudo-grey-scale" printing with halftone screens that use very small dots ("microscreens"). Furthermore, inkjet printing on various substrates other than paper is known. The term "industrial" substrates herein means substrates other than regular printing paper and include plastics, foils packaging materials, and so forth, as well as paper. One application is decorative prints.

There is a need in the art for UV curable inks that are relatively free of photoinitiator and that are adapted for several inkjet printing processes, including drop-on-demand inkjet printing using one or more piezoelectric inkjet heads, in particular wet-on-wet inkjet printing suitable for printing on a wide variety of industrial substrates, in particular grey-scale inkjet printing on a wide variety of industrial substrates.

Radiation curable inks, e.g., UV-radiation curable inks are described in European patent publication EP 0882104 to inventors Caiger, et al. (published Oct. 27, 1999) entitled "RADIATION CURABLE INK COMPOSITION," U.S. Pat. No. 5,104,448 to Kruse (issued Apr. 14, 1992) entitled "JET PRINTING INK COMPOSITIONS AND METHODS," U.S. Pat. No. 5,275,646 to Marshall et al. (issued Jan. 4, 1994) entitled "INK COMPOSITION," U.S. Pat. No. 5,623,001 to Figov (issued Apr. 22, 1997) entitled "INK COMPOSITION AND A METHOD FOR USING SAME," International (PCT) patent publication WO 9624642 to inventors Schofield, et al. (published Aug. 15, 1996) entitled "INK JET PRINTER INK COMPOSITION," and International (PCT) patent publication WO 9929788 to inventors Johnson, et al. (published Jun. 17, 1999) entitled "INK JET PRINTER INK COMPOSITION." These do not address reducing or eliminating photoinitiator.

The need to have UV curable compounds that are relatively free of photoinitiator has been recognized before. However, the prior art on eliminating or substantially reducing the amount photoinitiator has not specifically addressed inkjet inks and curing such inks by UV.

U.S. Pat. No. 5,446,073 to Jonsson, et al. (issued Aug. 29, 1995) entitled "PHOTOPOLYMERIZATION PROCESS EMPLOYING A CHARGE TRANSFER COMPLEX WITHOUT A PHOTOINITIATOR" describes a composition containing charge transfer complex from at least once unsaturated compound having an electron donor group and having an electron withdrawing group and being free of any photoinitiating compound that is polymerized by being subjected to ultraviolet light. Neither how to make or how to cure an inkjet ink relatively free of photoinitiator is described. Furthermore, the curing described is at UV wavelengths from an iron-doped lamp, i.e., using radiation rich in UVB. Aspects of the present invention include an ink for curing with a lamp rich in UVC and a curing method therefor.

U.S. Pat. No. 6,025,409 to Jansen (issued Feb. 15, 2000) entitled "RADIATION CURABLE COATING COMPOSITION" relates to a coating composition comprising (a) a radiation-curable binder composition comprising an unsaturated compound having at least one maleate, fumerate, itaconate, citraconate or mesaconate group; (b) an unsaturated vinylether compound and a compound which forms a strong exciplex with (a) or (b); that is otherwise free of a photoinitiating compound. This describes a coating material, not an ink. A coating—a varnish with no pigment—is typically easier to cure than an ink that contains pigment. Pigment typically absorbs UV radiation. Furthermore. Jansen uses an excimer lamp at 172 nm and an iron-doped lamp. A 172 nm source would not work for a thick ink layer, i.e., a layer with pigment, only for a thick coating. Excimer lamps also are known to produce a dull matte effect. No mention is made in Jansen as to how to produce the low viscosity required for inkjet printing. Furthermore, excimer lamps are not practical for an inkjet printer because they require a very low level of residual oxygen to work, they are relatively expensive, they are not known to be reliable, and they have a short life. Thus, again, how to make and cure an inkjet ink relatively free of photoinitiator is not described.

U.S. Pat. No. 6,030,703 to Fan, et al. (issued Feb. 29, 2000) entitled "RADIATION CURABLE COMPOSITIONS COMPRISING AN UNSATURATED POLYESTER AND A COMPOUND HAVING TWO TO SIX-PROPENYL ETHER GROUPS" describes a composition suitable for free radical, radiation curable coating comprising at least one polyester having unsaturated backbone and at least one compound having two to six propenyl ether groups, and optionally, a free radical photoinitiator. While no photoinitiator is used, the material described is for a coating—a varnish with no pigment—that is easy to cure compared to inks that have pigment. The curing described in U.S. Pat. No. 6,030,703 is by EB rather than by UV.

U.S. Pat. No. 6,034,150 to Hoyle, et al. (issued Mar. 7, 2000) entitled "POLYMERIZATION PROCESSES USING ALIPHATIC MALEIMIDES" describes aliphatic maleimides and methods using the same. Polymerization of compositions that include the compounds of the invention may be activated by irradiating the composition with radiation in the absence of a photoinitiator. However, there is no description of how to adapt this material to make inkjet inks. The ink invention described herein does not use such molecules.

U.S. Pat. No. 6,127,447 to Mitry, et al. (issued Oct. 3, 2000) entitled "PHOTOPOLYMERIZATION PROCESS AND COMPOSITION EMPLOYING A CHARGE TRANSFER COMPLEX AND CATIONIC PHOTOINITIATOR" describes a radiation curable coating composition is provided and includes an effective amount of cationic photoinitiator, in combination with a charge transfer complex. One embodiment is a compound containing free radical photoinitiator of between 0.5% by weight to about 1% by weight of the total composition and cationic photoinitiator of between 1% by weight to about 3% by weight of the total composition, so that there is in one embodiment at least 1.5% photoinitiator. Furthermore, cationic photoinitiator has been found to be incompatible with the other ink materials used in drop-on demand inkjet printing. Thus, there still is a need for inkjet inks that are relatively free of photoinitiator and that do not use cationic photoinitiators.

Thus there still is a need for a UV curable inkjet that is relatively free of photoinitiator, that can be completely cured in an acceptable amount of time. There also is a need for a method and apparatus for curing such an ink. In particular, there is a need for a UV curable inkjet ink suitable for drop-on-demand (DOD) inkjet printing. In particular, there is a need for a UV curable inkjet ink suitable for drop-on-demand (DOD) wet-on-wet inkjet printing

SUMMARY

One embodiment is a method of polymerizing one or more inkjet inks having a viscosity and superficial tension suitable for inkjet printing. The method includes depositing the one or more inks on the substrate using one or more inkjet heads in an inkjet printer, irradiating the deposited inks with UV radiation relatively high in UVC radiation ("UVC-rich radiation"), the UVC-rich radiation produced by a first UV source, the irradiation while the substrate is moved relative to the first UV source. The method further includes depleting the region close to the substrate surface of oxygen such that the between region between the first UV source and the laid out inks is relatively free of oxygen during the irradiating to increase the amount of UVC reaching the inks and to reduce the lowering caused by oxygen of the effectiveness of any photoinitiator in the ink. The inks are relatively free of photoinitiator.

Also described herein is an inventive UV curable inkjet ink comprising between 20% to 40% by weight of monofunctional acrylate between 35% to 55% by weight of difunctional acrylate, between 5% and 15% of trifunctional acrylate, between 5% and 15% highly reactive acrylate, up to 5% of one or more pigments, and no more than 0.5% of photoinitiator, which may be a single photoinitiator or a blend of two or more photoinitiators.

One embodiment further includes a relatively small amount, e.g., 0.5% to 1.5% by is weight, of one or more flow promoting agents for rheology control. The amount of flow promoting agent in one embodiment is approximately in the same ratio to that of the highly reactive acrylate.

Another embodiment includes substantially no photoinitiators.

DETAILED DESCRIPTION

Figure 1A:
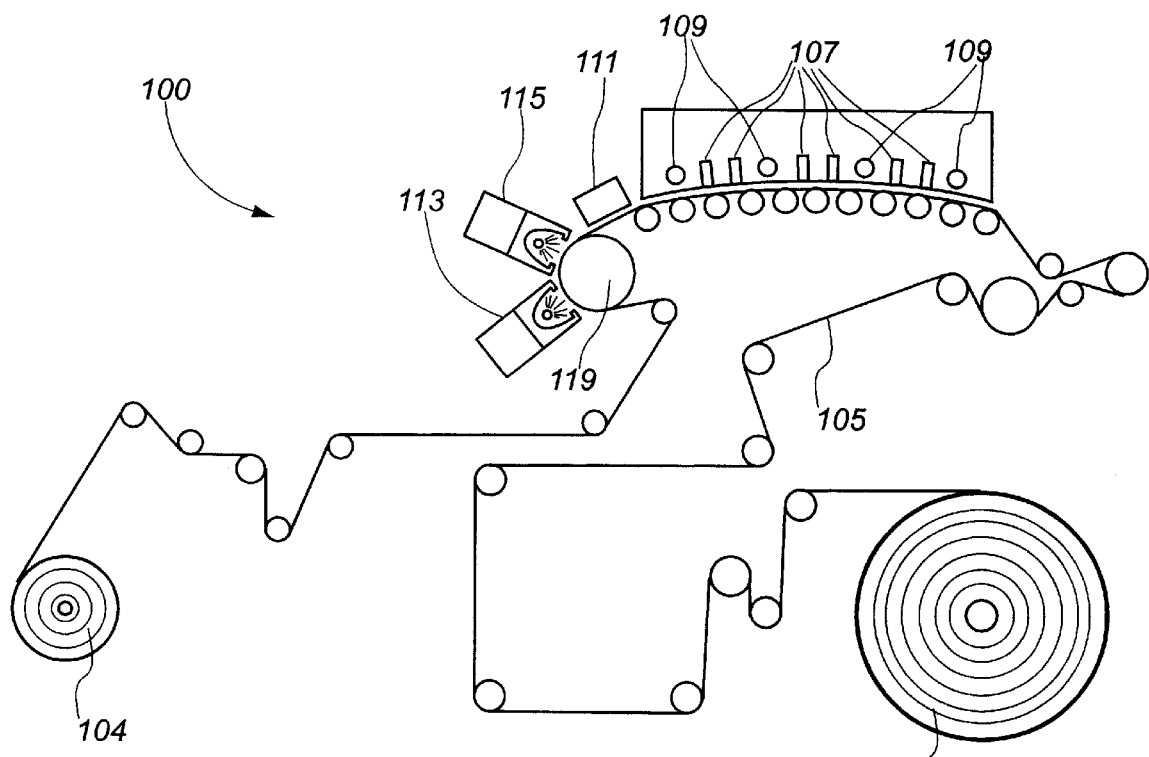
FIG. 1A shows one embodiment of an inkjet printer for industrial substrates.

One embodiment of the invention is a UV-curable ink composition for inkjet printing, in particular for industrial inkjet printing. Another embodiment is a method of curing one or more such inks. Yet another embodiment is an inkjet printer practicing the method.

By industrial inkjet printing is meant inkjet printing on to both non-paper and paper substrates, e.g., coated and non-coated wallpaper, laminate substrates, plastics thin foils, aluminum foils, vinyl, and paper. In one embodiment of an inkjet printer, the substrate is provided in roll form. Typical substrates need not have any special treatment or coating, although, as is known, coatings may be used to improve print quality.

One embodiment of the ink is for half-tone inkjet printing of up to six inks in one pass, e.g., CMYK and up to two special inks for spot colors. 360 pixels per inch grey-scale inkjet heads (using 3 bits, 8 grey-levels per pixel) give a perceived quality of 3 times 360=1080 dots per inch. The ink is adapted for printing at up to 5.000 droplets per second. Such one pass printing is referred to as wet-on-wet single pass printing. One embodiment of the curing method is for implementation on a single pass inkjet printer capable of printing at a linear speed of up to 21 m/min and an area coverage of up to 800 $m^2$/hour. Such a curing method needs to be capable of curing wet on wet layers of the inks fast.

One desirable property of an inkjet ink is adaptability ("tunability") for different applications. Different types of inkjet heads can use different inks. Composition of the ink is chosen to meet the Theological requirements for the inkjet heads used in the printer. One embodiment of the inkjet printer uses piezoelectric drop-on-demand inkjet heads. The ink may be formulated for binary (ink or no-ink) inkjet printing to form large dots, or for grey-scale inkjet printing. One embodiment of the inkjet printer provides grey-scale inkjet printing in the form of "pseudo-grey-scale" printing with halftone screens that use very small dots ("micro-screens"), so for such printing, the one embodiment of the ink is formulated for small droplets. The viscosity of the ink for such printing needs to be relatively low and there should be adequate superficial tension so that each inkjet head can produce the necessary small droplet rheology for small-dot, drop-on-demand inkjet printing, This is carried out by selecting appropriate long and short molecule materials in the binder of the ink composition. To achieve the required rheological match to the inkjet printing process requires selecting an appropriate mixture of monomer monofunctional materials that have the lowest viscosity and multifunctional materials (bi- or tri-functionality) that have a medium viscosity, and high reactive multifunctional materials that have relatively high viscosity. In particular, in one embodiment, the binder material includes a mixture of low functionality materials (monofunctional, difunctional, and trifunctional) selected to have low viscosity and small molecular weight. This provides for binder material that has the rheology suited for drop-on-demand inkjet printing. Note that some embodiments may include some amount of higher functionality monomers.

Note that at room temperature the mono and bifunctional acrylates have a range of viscosity between 2 and 40 cps, tri and some tetrafunctional acrylate have a range of viscosity between 100 and 1000 cps, while higher functional acrylate can have a range of approximately 1000 to 100000 cps. The relative amounts of different functionality of acrylates used in different embodiments depends on the maximum operating temperature window of the inkjet heads. The embodiments described herein are for jetting at up to 55° C. Some heads are known to operate as high as 75° C. using paste-like inks or even 125° C. for hot-melt inks. Such heads are binary and not for grey scale.

The inkjet ink embodiments described herein are thus adaptable to different types of inkjet printing (binary or grey-scale), drop on demand or continuous stream, and so forth. Another desirable property of an inkjet ink is having a wide operating range so that the ink is adaptable in terms of printing speed, the substrate it is applied on, and the thickness. An inkjet ink therefore should be tunable to provide versions with different viscosities and superficial tensions, and should be able to carry a wide range of colors.

One embodiment described herein is an inkjet ink that has one or more such desirable properties, that is UV curable and that is relatively free of photoinitiator.

The composition of the ink further is selected to have a particular reactivity for the radiation used, e.g., the speed and degree of polymerization suited to the radiation used and under the conditions of curing.

Ink Compositions

An ink composition for inkjet printing includes monomers (acrylates) possessing different degrees of functionality (average number of reactive groups per molecule), which can be combinations of mono, di, tri and, in some embodiments, higher functionality materials. The components are selected to be UV curable via acrylic polymerization and to have the property of adhering to the substrate surface after printing. Also included is a pigment. The acrylate components serve to bind the pigment.

Because the binder material is designed to achieve the rheological properties suitable for inkjet printing, and because low functionality monomers have low reactivity, curing such inks typically requires a lot of UV energy. Thus, typical prior-art inkjet inks contain one or more photoinitiators, forming typically between 5 and 10% of the ink composition.

Photoinitiators

A catalyst called a photoinitiator typically initiates the acrylic polymerization reaction. The photoinitiator requires less energy to activate than the molecules of the binder. Such polymerization is called "free-radical" UV polymerization. There are two types of mechanisms, one called NORRISH Type I and one called a NORRISH Type-II reaction In a typical ink film, the amount of UV energy at the surface may be orders of magnitude more than the amount of UV energy deep in the layer because of absorption by the pigment, the photoinitiator, etc. Thus, a different type of photoinitiator is used for deep curing.

In a NORRISH Type I reaction, a photoinitiator includes an electron attractive group. When UV light is absorbed, the molecule breaks to form a very unstable, highly reactive free radical that attacks double bonds in the acrylatce molecule and starts the polymerization.

In a NORRISH Type II reaction, the UV ionizes the photoinitiator molecule. The ionized molecule attaches to a co-initiator molecule and activates the co-initiator. When the co-initiator molecule is activated it forms a free radical that attacks the double bonds in the acrylate molecule and starts the polymerization. This two-step process requires less UV energy than the 1-step NORRISH Type I reaction.

Proper curing of a thick ink requires deep curing and surface curing, and each may require a different type of photoinitiator.

Because less UV energy is available for deep curing, in one embodiment of the curing method, curing is carried out in a two stage operation. A first UV source is used to effect surface cure. The interior of the layer is cured with another UV source. Because of the low viscosity of the inks, oxygen can diffuse very quickly into the ink layers. Thus, in one embodiment, the ink is first subjected to the interior cure and then to the surface cure.

Direct Ionization With Little or No Photoinitiator

UV radiation is generally classed as UVA, UVB, and UVC as follows:

UVA 400 nm to 320 nm
UVB 320 nm to 290 nm
UVC 290 nm to 100 nm

Ink experiments, it was observed that a particular range of UVC, 240 nm–200 nm, can lead to direct ionization of carbon-carbon double bonds. This requires a relatively large amount of UVC energy. UVC however is highly absorbed by oxygen. Thus, so long as the environment is relatively free of oxygen, it was observed that such direct ionization can carry out the radical chain polymerization without any or with a relatively small amount of photoinitiator. Furthermore, with no or virtually no oxygen present it was found that the polymerization completes, i.e., both the surface and inner layers of the ink completely cure, without the additional lamp when sufficient UVC energy in the 240 nm–200 nm range is used.

Thus in one embodiment, the first UV source is selected to be rich in UVC, in particular in the range of 240 nm–200 nm, and the method includes depleting oxygen from the atmosphere between the first UV source and the inks and substrate during irradiation by the first source. In one embodiment, the first UV source is from a mercury-doped UV lam p used in an atmosphere relatively free of oxygen, e.g., in a nitrogen atmosphere to effect surface cure. The lamp has a tunable power level of up to 200 W/cm.

In one embodiment, the method further includes irradiating the one or more ink layers on the substrate with a second UV source rich in UVA, a gallium-doped lamp in one embodiment with a power level of tip to 200 W/cm. Other embodiments may use an iron-doped lamp or a different lamp high in UVA and possibly high in both UVA and UVB. The second UV source cures the interior of the ink layer. Radiation from the second source is applied first. Using two UV sources has been found to have the advantage of relatively low inert gas (e.g., nitrogen) consumption and fast curing speed.

The Ink Embodiments

The first set of components of one ink embodiment is a mixture of two or more monomers (acrylates) possessing different degrees of functionality (average number of reactive groups per molecule), including combinations of mostly mono, di and tri functionality material. Some higher functionality materials also may be included. The components are selected to be UV curable and to have the property of adhering to the substrate surface after printing. The materials further are selected to have low viscosity and low molecular weight. The first set of components thus serves to bind the pigment and to assure the rheological and physical properties of the ink film.

One embodiment includes the first set of components comprising between 20% and 40% of monofunctional acrylate, between 35 and 55% of difunctional acrylate, and between 5% and 15% by weight trifunctional acrylate.

One particular embodiment includes approximately 30% by weight monofunctional acrylate, approximately 45% by weight difunctional acrylate, and approximately 10% by weight trifunctional acrylate.

In an experiment to identify candidates for the first set of components, a set of mostly acrylate or urethane-acrylate-based monomers and polyfunctional oligomer were tested. In particular, the following branded products were tested (see Table 1 below for sources of branded product): Ebecryl 40, Ebecryl 1039, DPGDA, TPGDA, ODA-n, TTEGDA, POEA, Ebecryl 160, OTA 480, IRR 289, TMPTA, IRR 184, Ebecryl 111, Ebecryl 110, IBOA, HDDA, and Ebecryl 81. Also tested were ACTILANE 872, ACTILANE 735, Actilane 584, ACTILANE 525, ACTILANE 440, ACTILANE 432, ACTILANE 430, ACTILANE 423, ACTILANE 421, ACTILANE 251. Clearly other monomers and polyfunctional oligomers may be used.

One aspect of the invention is promoting the direct ionization of the acrylates in the set forming the first set of components by depleting the curing region of oxygen and irradiating by a source rich in UVC, in particular UVC in the range of 200 nm to 240 nm.

While such direct ionization can carry out the radical chain polymerization without any or with a relatively small amount of photoinitiator, one or more additional materials are added in one embodiment to speed up the reaction.

Thus, the second set of components includes a highly reactive acrylate such as epoxy vinylester acrylate. When such a highly reactive acrylate is included, the polymerization process is significantly speeded up. The epoxy vinylester group is very reactive under high UVC energy and a highly branched polymer is formed. Thus, in one embodiment, epoxy vinylester acrylate is added, for example in the form of Genomer 2253 available from Rahn of Zurich, Switzerland. Between 5% and 15% by weight of such a highly reactive acrylate produced excellent results, i.e., resulted in inks that were well cured and had the rheological properties desired for the wet-on-wet drop-on-demand inkjet printing.

Thus, in one embodiment, between 5% and 15% by weight of a set of one or more highly reactive acrylates such as epoxy vinylester acrylate is included. In a particular embodiment approximately 10% of epoxy vinylester acrylate is included.

The ink embodiments includes as a third set of compounds one or more pigments forming in total 5% or less of the ink composition.

One embodiment further includes as a fourth set of components, a relatively small amount, e.g., 0.5% to 1.5% by weight, of one or more low viscosity stabilizers for rheology control and stability. One suitable stabilizer is Genorad 16, a stabilizer made by Rahn of Zurich, Switzerland. The amount of stabilizer in one embodiment is approximately in the same ratio to that of the highly reactive acrylate included in the mixture. In one embodiment, the amount of stabilizer is approximately one tenth the amount of highly reactive acrylate. Thus, in one embodiment that includes approximately 10% of epoxy vinylester acrylate, about 1% of Genorad 16 is included.

For some inks, the reactivity without any photoinitiators is too low. In such cases, it was found that a fifth set of components, that includes a minute amount of one or more photoinitiators, provided great advantage. The fifth set of components tested in the experiment included minute quantities of one or more photoinitiators suitable for free radical curing, including the following molecules: 2-Hydroxy-2-methyl-1-phenyl-propan-1-one, Bis (2,6-dimethoxybenzoyl)-2,4,4-trimethylpentylphosphineoxide, 2,4,6-Trimethylbenzoyl-diphenyl-phosphineoxide, 2-Methyl-1[4-(methylthio)phenyl]-2-morpholinopropan-1-one, benzophenone, 1-Hydroxyl-cyclohexyl-phenyl-ketone, 2-Benzyl-2-dimethylamino-1-(4-morpholinophenyl)-butanone-1,2,2-Dimethoxy-1,2-diphenylethan-1-one, Iso-propyl thioxantone, and 5,7-Diiodo-3-butoxy-6-fluorone. This list is not comprehensive. Tested were the following brands of photoinitiators: Benzophenone, Irgacure 184, Irgacure 500, Darocur 1173, Irgacure 907, ITX, Lucirin TPO, Irgacure 369, Irgacure 1700, Darocur4265, Irgacure 651, Irgacure 819, Irgacure 1000, Irgacure 1300, Esacure KT046, Esacure KIP150. Esacure KT37, Esacure EDB, H-Nu 470, H-Nu 470X. Again, other photoinitiators may be used when photoinitiators are included.

In one embodiment, no more than 0.8% by weight of one or more photoinitiators were included in any ink.

In another embodiment, no more than 0.3% by weight of one or more photoinitiators were included in any ink. One particular photoinitiator, Darocure 1173 (Ciba-Geigy, Ardsley, N.Y.), was found to be very effective in such minute quantities (0.3% or less).

As an example, the following formulation produced an ink with a viscosity measured 42 cps at 23 deg. Celsius: about 29–30% of monoacrylates, about 44–45% diacrylates, about 10% of triacrylates, about 10% of epoxy vinylester, about 1% of a flow promoting agent, at most about 5% of pigment and between zero and 0.3% of photoinitiator.

The Inkjet Printer, The Curing, and The Oxygen Depletion

FIG. 1A shows in simplified form one embodiment of an inkjet printer 100 that uses the ink embodiments and that carries out the inkjet printing and the inventive UV curing method. The substrate 105 is supplied in roll form. The substrate path starts with supply roll 103 and passes through sets of rollers to a take-up reel 104. A drive mechanism (not shown) moves the substrate at a linear speed adjustable between 5 and 21 m/min relative to the inkjet heads. Six sets of inkjet heads 107 provide for printing between one and six colors in a single pass. Each inkjet head 107 prints a width of 70 mm, and between two and nine inkjet heads of each color can cover a width of up to 630 mm on the substrate 105. The printer 100 is capable of printing up to 800 m²/hour.

In one embodiment each inkjet head carries out drop-on-demand half-tone printing at 360 pixels per inch, with 3 bits, i.e., 8 grey-levels per pixel giving a perceived quality of 3 times 360=1080 dots per inch. The inkjet heads 107 are capable of 5,000 droplets per second.

The inkjet printer includes at least a first UV source (a lamp) 113 for curing. The curing wavelength range of the first UV sources 113 is tunable. The power level also is adjustable up to about 200 W/cm². In one embodiment, the first UV source 113 includes a tubular mercury-doped discharge lamp and is designed to provide radiation particularly high in UVC, in particular, UVC in the wavelength range of 200 nm to 240 nm to facilitate curing by direct ionization with no or little photoinitiator.

Figure 1B:
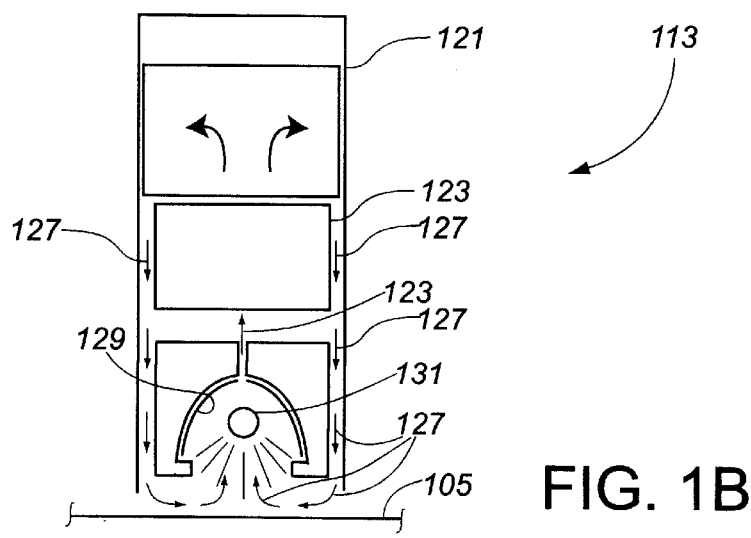
FIG. 1B shows one embodiment of a UV source for use in the printer shown in FIG. 1A for curing embodiments of the ink.

FIG. 1B shows one embodiment of the first UV sources 113. The UV source includes a housing 121, a 630 mm wide mercury-doped discharge lamp 131 and a reflector 129 to reflect the radiation towards a focal area at the surface of the substrate 105. In one embodiment, the reflector 129 is coated with a material that preferentially reflects UVC radiation, in particular UVC in the range of 200 nm to 240 nm in wavelength. Because the UV lamps typically generate a lot of heat, the first UV source 113 also includes a cooling system 123 that dissipates the waste heat generated by the lamp 131. The cooling system also acts as a gas circulation system that force-conveys a stream 127 of $N_2$ gas in the region near the lamp 131, including between lamp and both the reflector 129 and the focal area of the lamp in order to deplete the environment of oxygen to increase the UVC that reaches the focal area. In one embodiment, to further reduce the heat dissipated, the reflector has a coating designed to reduce the IR radiation generated.

One embodiment of the first UV source high in UVC is the BLK-U system made by IST METZ GmbH, Neurtingen, Germany. This BLK-system includes a gas circulation system that places a blanket of gas around the lamp. See International patent WO 0061999 entitled "IRRADIATION DEVICE" to assignee IST METZ and inventors Schwarz, et al., published Oct. 19, 2000. See also U.S. Pat. No. 5,945,680 to Jensen entitled METHOD FOR ACTIVATING PHOTOINITIATORS IN PHOTOSENSITIVE SUBTRATES AND AN APPRATUS FOR CURING SUCH SUBSTRATES, issued Aug. 31, 1999.

Other manufacturers of UV sources high in UVC that can be used for curing one or more embodiments of the ink include: IST METZ GmbH, Neurtingen, Germany (IST), Fusion UV Systems, Inc., Alton, UK (FUSION), Eltosch Torsten Schmidt GmbH, Hamburg, Germany ("ELTOSCH"). Dr. K. Honle GmbH, Munich, Germany ("HONLE"), and Printconcept GmbH, Koengen, Germany ("PRINTCONCEPT").

One embodiment shown in FIG. 1A also includes a second UV source 115 that includes a second lamp rich in UVA and UVB, e.g., a gallium or iron-doped lamp that also provides UVC radiation. The second UV source 115 is placed to cure the material before the first UV source. It is known that different colored inks absorb UV radiation differently, i.e., they each absorb differently in each of the UVA, UVB and UVC range. Having two curing lamps ensures complete curing of all colors in a single pass. For example, some inks absorb UVC, so that deep parts of the ink layers may not be cured with only the first UV source. The second UV source in such a case cures the deep parts of the ink layers. The first UVC-rich source completes the curing in particular curing the parts of the ink layers close to the surface. Thus all ink embodiments, even "difficult" colors such as black and thick inks may be cured in a single pass.

In one embodiment, the second UV source 115 includes a tubular gallium-doped or iron-doped discharge lamp and is designed to provide radiation high in UVA and UVB above 300 nm and also UVC radiation. In one particular embodiment, the second UV source is almost identical to the first UV source, except for the lamp and the radiation produced. The power level also is the same. One embodiment uses the BLK-U system made by IST METZ for both the first and second UV sources.

Even though the first and second UV sources 113 and 115 each includes a mechanism for cooling the lamp, a substantial amount of heat may still be generated. One embodiment of the inkjet printer 100 includes a cooling system 119 that cools the substrate in the focal plane region from beneath the substrate. In one embodiment, the cooling system includes a counter-roller with a cylindrical core through which air or water or a combination thereof may be circulated. Other embodiments of a cooling system may use a counter cylinder or a counter plate or both.

Figure 2A:
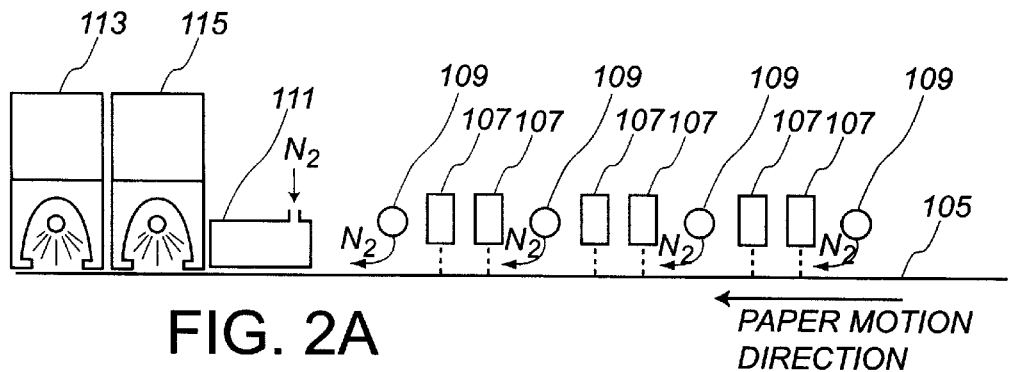
FIGS. 2A and 2B show in a simplified manner the tubular nitrogen inertization system, the inkjet heads, the blade nitrogen distributor and the UV source high in UVC according to one embodiment of an inkjet printer for industrial substrates.
Figure 2B:
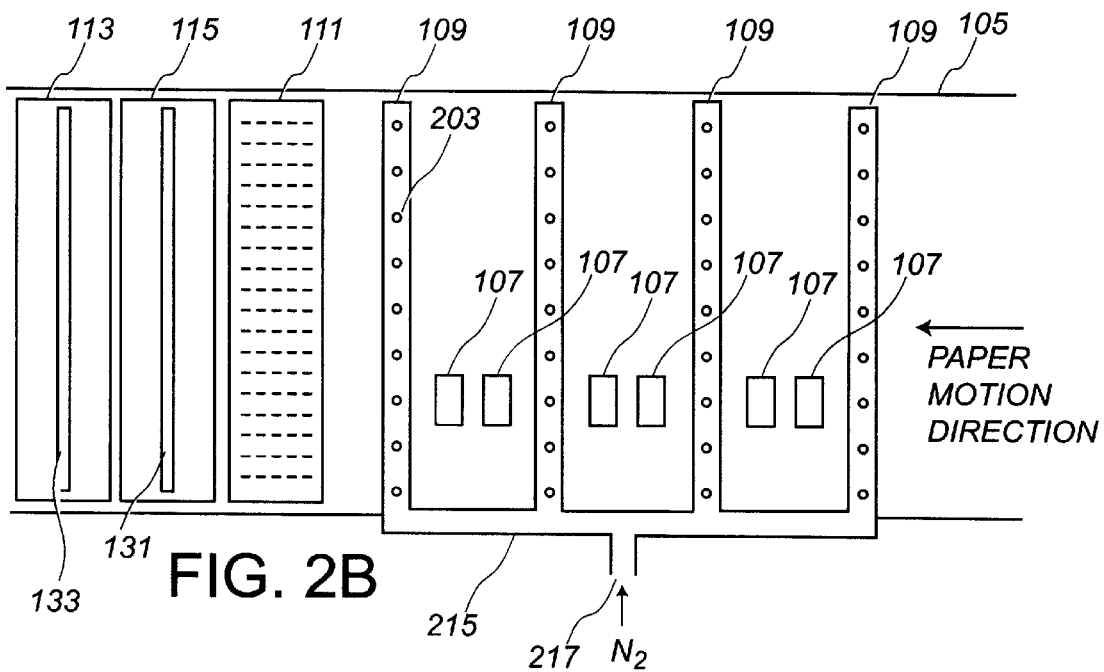

One embodiment further includes one or more oxygen depletion units other than any depletion unit built into the UV sources. The oxygen depletion units place a blanket of nitrogen or other relatively inert gas (e.g., $CO_2$), with adjustable position and adjustable inert gas concentration, in order to deplete the curing environment from oxygen. This facilitates curing, in particular "direct polymerization." One embodiment includes a tube distributor comprising one or more tubes 109 surrounding the inkjet heads 107 with holes directed towards the substrate such that nitrogen flows through the holes towards the substrate surface in the vicinity of the inkjet heads. FIGS. 2A and 2B show an embodiment of the tube distributor in more detail. FIG. 2A shows a simplified cross-section showing how in one embodiment there are four tubes 109 surrounding three pairs of the heads 107. FIG. 2B shows a simplified top view. The tube distributor includes a interconnection pipe 215 to distribute nitrogen gas to the four tubes 109 that have holes such as hole 203. Nitrogen gas enters the interconnection pipe 215 via an intake 217. The relative motion between the substrate 105 and the tube distributor causes a blanket of nitrogen to remain near the substrate surface during jetting and after the jetting of the inks.

Figure 2C:
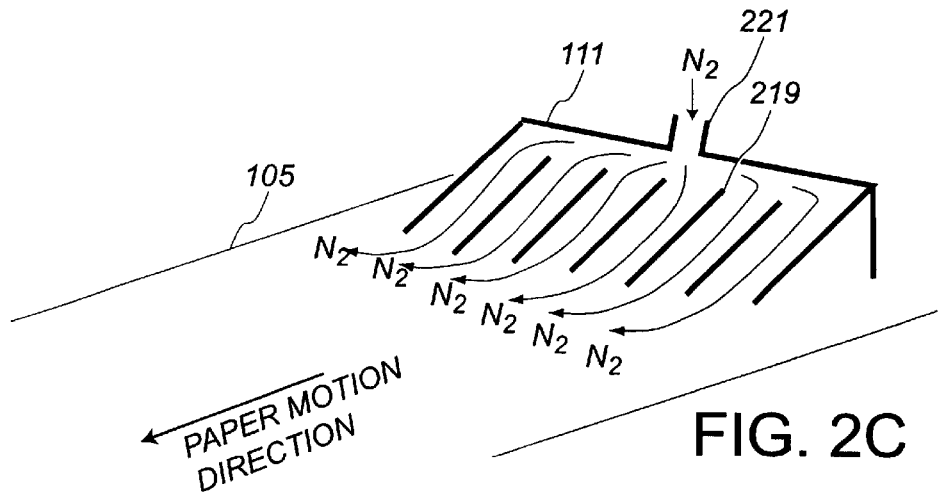
FIG. 2C shows in a simplified manner the blade nitrogen according to one embodiment of an inkjet printer for industrial substrates.

One embodiment also includes a blade inert gas distributor 111 near the lamp further adding nitrogen to the blanket of nitrogen placed by the tubes 109 of the tube distributor. As shown in FIGS. 1, 2A and 2B, the blade distributor is placed just before the first UV source along the path of the substrate and close to the substrate surface. FIG. 2C shows the blade distributor 111 in more detail, albeit in a simplified form. Nitrogen (or some other relatively inert gas) enters the blade distributor via an intake 221 and is distributed between a set of blades 219. The relative motion between the substrate 105 and the blade distributor 111 causes the blanket to remain close to the substrate as the substrate passes under the first UV source 113. All three inertization mechanisms ensure a relatively minute level of oxygen during curing. In particular, with all three inertization mechanisms, the residual oxygen level can be maintained as low as 200 ppm, but in general in the range of 200 ppm to 1200 ppm.

One embodiment further includes an oxygen detector under the first UV source to provide for measuring the residual oxygen level and thus to provide ensuring that the residual oxygen level is low enough during curing.

Note that because of the better shielding provided, the blade distributor uses less gas than the tube system.

Experimental Evaluation

The following experiments were performed with a prototype inkjet system. The system included two IST BLKU sources operating at a power level of 200 W/cm with a 67 mm lamp diameter at a linear speed of 10 m/min.

The following table describes the peak Irradiance in mW/cm$^2$ and the energy dose in mJ/cm$^2$ at different parts of the UV spectrum used in the experiments.

TABLE 1

| Lamp | speed | Irradiance (mW/cm2) | | | | Energy Dose (mJ/cm2) | | | |
|------|-------|------|------|------|--------|------|------|------|--------|
|      |       | UVA  | UVB  | UVC  | UV-VIS | UVA  | UVB  | UVC  | UV-VIS |
| Hg   | 10    | 1133 | 1262 | 216  | 373    | 388  | 434  | 75   | 148    |
| Fe   | 10    | 2229 | 1166 | 140  | 646    | 852  | 437  | 53   | 275    |
| Ga   | 10    | 976  | 1036 | 131  | 937    | 360  | 390  | 49   | 384    |

The inks were evaluated with many combinations of lamps and oxygen depletion units and with two ranges of levels of residual oxygen and photoinitiator content: 200 ppm or less residual oxygen with no photoinitiator, and 20,000 ppm or less residual oxygen with 0.3% photoinitiator. The following is a non-exhaustive list of the combinations used. In TABLE 2, "lamp" means the oxygen depletion unit built in to the UV sources, "tube" means the tube distributor, "blade" means the blade distributor, Hg only means a single mercury-doped lamp UV source, Ga means the second source using a gallium lamp, Fe means the second UV source using an iron-doped lamp. An "X" in a cell means one of the combinations tried. Note that the absence of an X does not mean that good results would not be obtained, but rather that the combination was not tried. Thus, TABLE 2 is not an exhaustive list of satisfactory combinations.

TABLE 2

|         | Nitrogen source | | | | | | |
|---------|---------|-------|------|--------------|--------------|---------------|------------------------|
| Lamps   | in lamp | blade | tube | lamp + tube  | lamp + blade | blade + tube  | lamp + blade + tube    |
| Hg only | X       | X     | X    | X            | X            |               |                        |
| Ga + Hg | X       | X     | X    |              |              | X             | X                      |
| Fe + Hg | X       | X     | X    |              |              | X             | X                      |

One embodiment of the resulting ink has a viscosity broadly between 10 cps and 100 cps at room temperature and in particular, between 20 cps and 45 cps at room temperature.

Depending on the concentration of photoinitiator and the kind of photoinitiator used, perfect curing was achieved with very low residual odor, with a concentration of residual oxygen between 200 and 20,000 parts per million (ppm). For example, it was observed that the same perfect curing occurred with no photoinitiator at 200 ppm residual oxygen as with 0.3% photoinitiator at 20,000 ppm, i.e., 2% residual oxygen.

In general, the best results were obtained with a system that used two UV sources, one with a Hg lamp, the other a Fe-doped lamp, using the built-in depletion units of the UV sources and both the blade distributor and the tube distributor. However, it was found that the performance was acceptable in all the cases marked with an "X" in TABLE 1. Cases not marked with an X may also be acceptable, but were not tried. In general, it was found the performance of using the lamp oxygen depletion with the blade distributor was better than lamp oxygen depletion with the tube distributor which in turn was better than using only the lamps' built-in oxygen depletion. Also, using both a mercury-lamp-based UV source and an iron lamp based UV source was better than using both a mercury-lamp-based UV source and a gallium-lamp-based UV source, which in turn was better than using a single mercury-lamp-based UV source.

A 200 ppm residual oxygen experiment was performed with a single UV source (one Hg lamp) with the nitrogen applied to the lamp using the UV source's built-in depletion unit. This is the worse case, yet was still found to give acceptable results. Excellent physical and organoleptic curing properties were achieved using the two UV sources with nitrogen applied using the two source's built-in depletion units and using the blade distributor system. One embodiment uses a single source of nitrogen so that the same amount of nitrogen is applied to each built-in depletion unit in the one or two UV sources, and to the blade distributor if used, as well as to the tube distributor, if used.

Note that in practice, 2% residual oxygen is achievable with relatively little nitrogen consumption. So if the ink has about 0.3% photoinitiator, a typical printer such as described above need consume only a few cubic meters of nitrogen per day for typical industrial usage.

Curing was evaluated with different well-known tests such as the scotch test, the thumb twist test, the scratch test, and the MEK solvent test. The ink embodiments described herein passed all tests.

To follow and trace the state of the polymerization reaction, the rate of double bond conversion was monitored using Fourier transform Infrared (FTIR) equipment, as is standard in the art.

If the reaction is not complete, some free photoinitiator might remain in the ink after curing. To determine the amount of free photoinitiator several techniques such XPS, ToFSIMS, GC-MS, DSC and MSS are available.

The migration of the free monomers and photoinitiator through the substrate also may be measured.

In these ways, the curing levels with different colors and different ink film thickness were measured under different conditions As would be expected, it was observed that the level (if any) or kind of photoinitiator needed depends upon the kind of pigment used and also depends upon the ink film thickness.

Brand Names

The compounds and brand names listed above should be known to those skilled in the art.

The following table gives some of the sources for the brand names.

TABLE 1

| Brand Name(s) | Source |
| --- | --- |
| ACTILANE (all types) | Akcros, Manchester, UK |
| Benzophenone | Fratelli Lamberti, Italy |
| Darocur (all types) | Ciba-Geigy, Ardsley, N.Y. |
| Dipropylene glycol diacrylate (DPGDA) | UCB Chemicals, Drogenbos, Belgium |
| Ebecryl (all types) | UCB Chemicals, Drogenbos, Belgium |
| Esacure (all types) | Fratelli Lamberti, Italy |
| Genomer 2223 | Rahn, Zurich, Switzerland |
| Genorad 16 | Rahn, Zurich, Switzerland |
| 1,6-hexanediol diacrylate (HDDA) | UCB Chemicals, Drogenbos, Belgium |
| H-NuX (all types) | Spectra Group Limited, Inc., Maumee, OH |
| IBOA | UCB Chemicals, Drogenbos, Belgium |
| Irgacure (all types) | Ciba-Geigy, Ardsley, N.Y. |
| IRR (all types) | UCB Chemicals, Drogenbos, Belgium |
| ITX | Fratelli Lamberti, Italy |
| Lucirin TPO | BASF Germany |
| ODA-n | UCB Chemicals, Drogenbos, Belgium |
| OTA 480 | UCB Chemicals, Drogenbos, Belgium |
| phenoxyethyl acrylate (POEA) | UCB Chemicals, Drogenbos, Belgium |
| TMPTA | UCB Chemicals, Drogenbos, Belgium |
| tripropyleneglycol diacrylate (TPGDA) | UCB Chemicals, Drogenbos, Belgium |
| tetraethylene glycol diacrylate (TTEGDA) | UCB Chemicals, Drogenbos, Belgium |

Thus, an ink relatively free of photoinitiator, and a method of curing the ink have been described.

Note that alternate embodiments can use more or fewer inkjet heads. Furthermore, alternate embodiments can use fewer than all three oxygen depletion mechanisms.

Thus, while there has been described what is believed to be the preferred embodiments of the invention, those skilled in the art will recognize that other and further modifications may be made thereto without departing from the spirit of the invention and it is intended to claim all such changes and modifications as fall within the scope of the invention.

What is claimed is:

1. A method of polymerizing one or more inkjet inks including pigment and having a viscosity and superficial tension suitable for inkjet printing, the method comprising the steps of:
   depositing the one or more inks on a substrate using one or more inkjet heads in an inkjet printer;
   irradiating the deposited inks with UV radiation relatively high in UVC radiation, the UVC-rich radiation produced by a first UV source, the irradiation while the substrate is moved relative to the first UV source; and
   depleting the region close to the substrate surface of oxygen such that the region between the first UV source and the laid out inks has 2% or less residual oxygen during the irradiating to increase the amount of UVC reaching the inks,
   such that the inks can be relatively free of photoinitiator, the relative amount of photoinitiator in any ink being about 0.3% or less by weight.

2. A method as recited in claim 1, wherein the first UV source supplies UV radiation high in radiation of wavelengths between 200 nm and 240 nm.

3. A method as recited in claim 1, wherein the components of the one or more inkjet inks are selected so that the viscosity of the inks is in the range of about 10 centipoise (cps) to about 100 cps at room temperature.

4. A method as recited in claim 3, wherein the components of the one or more inkjet inks are selected so that the viscosity of the inks is in the range of about 20 to about 45 cps at room temperature.

5. A method as recited in claim 1, wherein the region between the first UV source and the laid out inks has 200 ppm or less residual oxygen and the inks have no photoinitiator.

6. A method as recited in claim 1, wherein the oxygen depleting includes providing a blanket of relatively inert gas between the deposited inks and the first UV source.

7. A method as recited in claim 6, wherein the blanket of relatively inert gas is provided at the first UV source and at least one other location.

8. A method as recited in claim 7, wherein the at least one other location includes a region close to the first UV source prior to the substrate reaching the first UV source, and wherein the providing of the gas in the region close to the first UV source uses a blade distributor.

9. A method as recited in claim 6, wherein the gas is nitrogen.

10. A method of polymerizing one or more inkjet inks including pigment and having a viscosity and superficial tension suitable for inkjet printing, the method comprising the steps of:
    depositing the one or more inks on a substrate using one or more inkjet heads in an inkjet printer;
    irradiating the deposited inks with UV radiation relatively high in UVC radiation, the UVC-rich radiation produced by a first UV source, the irradiation while the substrate is moved relative to the first UV source; and
    depleting the region close to the substrate surface of oxygen such that the region between the first UV source and the laid out inks is relatively free of oxygen during the irradiating to increase the amount of UVC reaching the inks, the depleting includes providing a blanket of relatively inert gas between the deposited inks and the first UV source, the providing of gas being at the first UV source and at least one other location including one or more regions surrounding the inkjet heads, the providing of the gas surrounding the inkjet heads using a tube distributor that includes tubes having holes pointing towards the substrate to direct the relatively inert gas towards the substrate,
    such that that inks can be relatively free of photoinitiator.

11. A method as recited in claim 10, wherein the at least one other location further includes a region close to the first UV source prior to the substrate reaching the first UV source wherein the providing the gas in the region before the first UV source uses a blade distributor.

12. A method of polymerizing one or more inkjet inks including pigment and having a viscosity and superficial tension suitable for inkjet printing, the method comprising the steps of:
    depositing the one or more inks on a substrate using one or more inkjet heads in an inkjet printer;
    irradiating the deposited inks with UV radiation relatively high in UVC radiation, the UVC-rich radiation produced by a first UV source, the irradiation while the substrate is moved relative to the first UV source;
    irradiating the deposited inks with UV radiation relatively high in one or more of UVA radiation and UVC radiation ("UVA rich radiation"), the UVA radiation produced by a second UV source, the irradiation while the substrate is moved relative to the second UV source; and depleting the region close to the substrate surface oxygen such that the region between the first UV source and the laid out inks is relatively free of oxygen during the irradiating to increase the amount of UVC reaching the inks, the depleting includes providing a blanket of relatively inert gas between the deposited inks and the first UV source, such that that inks can be relatively free of photoinitiator.

13. A method as recited in claim 12, wherein the first UV source uses a mercury-doped lamp and wherein the second UV source uses a gallium-doped lamp.

14. A method as recited in claim 12, wherein the first UV source uses a mercury-doped lamp and wherein the second UV source uses an iron-doped lamp.

15. A method of polymerizing one or more inkjet inks including pigment and having a viscosity and superficial tension suitable for inkjet printing, the method comprising the steps of:

depositing the one or more UV curable inkjet inks on a substrate using one or more inkjet beads in an inkjet printer;

irradiating the deposited inks with UV radiation relatively high in UVC radiation, the UVC-rich radiation produced by a first UV source, the irradiation while the substrate is moved relative to the first UV source; and depleting the region close to the substrate surface of oxygen such that the region between the first UV source and the laid out inks is relatively free of oxygen during the irradiating to increase the amount of UVC reaching the inks, such that that inks can be relatively free of photoinitiator, each UV curable inkjet ink including:

between approximately 20% and 40% by weight of one or more monofunctional acrylates;

between approximately 35% and 55% by weight of one or more difunctional acrylates;

between approximately 5% and 15% by weight of one or more trifunctional acrylates;

between approximately 5% and 15% by weight of one or more highly reactive acrylates;

no more than approximately 5% by weight of one or more pigments; and no more than approximately 0.8% by weight of one or more photoinitiators.

16. A method as recited in claim 15, wherein each UV curable inkjet ink further includes:

between approximately 0.5% and 1.5% by weight of one or more stabilizers for flow control.

17. A method as recited in claim 16, wherein the stabilizers include Genorad 16.

18. A method as recited in claim 15, wherein each UV curable inkjet ink further includes no more than approximately 0.3% by weight of one or more photoinitiators.

19. A method as recited in claim 15, wherein the highly reactive acrylates include epoxy vinylester acrylate.

20. A UV curable inkjet ink comprising:

between approximately 20% and 40% by weight of one or more monofunctional acrylates;

between approximately 35% and 55% by weight of one or more difunctional acrylates;

between approximately 5% and 15% by weight of one or more trifunctional acrylates;

between approximately 5% and 15% by weight of one or more highly reactive acrylates;

no more than approximately 5% by weight of one or more pigments; and no more than approximately 0.8% by weight of one or more photoinitiators, such that the ink has a viscosity suitable for inkjet printing.

21. A UV curable inkjet ink as recited in claim 20, further comprising:

between approximately 0.5% and 1.5% by weight of one or more stabilizers for flow control.

22. A UV curable inkjet ink as recited in claim 21, wherein the stabilizers include Genorad 16.

23. A UV curable inkjet ink as recited in claim 20, including no more than approximately 0.3% by weight of one or more photoinitiators.

24. A UV curable inkjet ink as recited in claim 20, wherein the highly reactive acrylates include epoxy vinylester acrylate.

25. A UV curable inkjet ink as recited in claim 20, wherein least some of the monofunctional acrylates, the difunctional acrylates and the trifunctional acrylates are selected so that the ink has a room temperature viscosity of between 10 and 100 cps.

26. A UV curable inkjet ink as recited in claim 25, wherein at least some of the monofunctional acrylates, the difunctional acrylates and the trifunctional acrylates are selected so that the ink has a room temperature viscosity of between 20 and 45 cps.

27. A UV curable inkjet ink as recited in claim 25, such that the ink is jettable by a piezoelectric inkjet nozzle.

28. An apparatus to deposit onto a substrate and polymerize one or more UV curable inkjet inks including poignant and having a viscosity and superficial tension suitable for inkjet printing, the apparatus comprising:

one or more inkjet heads to deposit the one or more inks on the substrate, the relative amount of photoinitiator in any ink being about 0.3% or less by weight;

A first UV source to irradiate the deposited inks with UV radiation relatively high in UVC radiation while the substrate is moved relative to the first UV source;

A drive to move the substrate relative to the first UV source; and one or more oxygen depletion units to deplete oxygen from the region between the first UV source and the laid out inks close to the substrate surface to increase the amount of UVC reaching the inks during the irradiation, the one or more oxygen depletion units being to reduce the oxygen in the region between the first UV source and the laid out inks to 2% or less residual oxygen, such that that inks can be relatively free of photoinitiator.

29. An apparatus as recited in claim 28, wherein the first UV source supplies UV radiation high in radiation of wavelengths between 200 nm and 240 nm.

30. An apparatus as recited in claim 29, wherein the first UV source uses a mercury-doped lamp.

31. An apparatus as recited in claim 28, wherein the components of the one or more inkjet inks are selected so that the viscosity of the inks is in the range of about 10 centipoise (cps) to about 100 cps at room temperature.

32. An apparatus as recited in claim 31, wherein components of the one or more inkjet inks are selected so that the viscosity of the inks is in the range of about 20 to about 45 cps at room temperature.

33. An apparatus as recited in claim 28, wherein the one or more oxygen depletion units reduce the oxygen in the region between the first UV source and the laid out inks to 200 ppm or less residual oxygen, and wherein the inks have no photoinitiator.

34. An apparatus as recited in claim 28, wherein the one or more oxygen depletion units provide a blanket of relatively inert gas between the deposited inks and the first UV source.

35. An apparatus as recited in claim 34, wherein the one or more oxygen depletion units include a first oxygen depletion unit to provide inert gas at the location of the first UV source and at least one other oxygen depletion unit in at least one other location, the at least one other location further including a region close to the first UV source prior to the substrate reaching the first UV source, and the at least one other oxygen depletion unit including a blade distributor to provide the gas in the region before the first UV source.

36. An apparatus as recited in claim 34, wherein the gas is nitrogen.

37. An apparatus to deposit onto a substrate and polymerize one or more UV curable inkjet inks including pigment and having a viscosity and superficial tension suitable for inkjet printing, the apparatus comprising:

one or more inkjet heads to deposit the one or more inks on the substrate;

A first UV source to irradiate the deposited inks with UV radiation relatively high in UVC radiation while the substrate is moved relative to the first UV source;

A drive to move the substrate relative to the first UV source; and one or more oxygen depletion units to deplete oxygen from the region between the first UV source and the laid out inks close to the substrate surface to increase the amount of UVC reaching the inks during the irradiation, the one or more oxygen depletion units to provide a blanket of relatively inert gas between the deposited inks and the first UV source, the one or more oxygen depletion units including a first oxygen depletion unit to provide inert gas at the location of the first UV source and at least one other oxygen depletion unit in at least one other location including one or more regions surrounding the inkjet heads, the at least one other oxygen depletion unit including a tube distributor that includes tubes in the regions surrounding the inkjet heads having holes pointing towards the substrate to direct the relatively inert gas towards the substrate, such that that inks can be relatively free of photoinitiator.

38. An apparatus as recited in claim 37, wherein the at least one other location further includes a region close to the first UV source prior to the substrate reaching the first UV source and wherein the at least one other oxygen depletion unit includes a blade distributor to provide the gas in the region before the first UV source.

39. An apparatus to deposit onto a substrate and polymerize one or more UV curable inkjet inks including pigment and having a viscosity and superficial tension suitable for inkjet printing, the apparatus comprising:

one or more inkjet heads to deposit the one or more inks on the substrate;

A first UV source to irradiate the deposited inks with UV radiation relatively high in UVC radiation while the substrate is moved relative to the first UV source;

A second UV source to irradiate the deposited inks with UV radiation relatively high in one or more of UVA radiation and UVC, the irradiation by the second UV source while the substrate is moved relative to the second UV source;

A drive to move the substrate relative to the first and second UV sources; and one or more oxygen depletion units to deplete oxygen from the region between the first UV source and the laid out inks close to the substrate surface to increase the amount of UVC reaching the inks during the irradiation, the one or more oxygen depletion units to provide a blanket of relatively inert gas between the deposited inks and the first UV source, such that that inks can be relatively free of photoinitiator.

40. An apparatus as recited in claim 39, wherein the first UV source uses a mercury-doped lamp and wherein the second UV source uses a gallium-doped lamp.

41. An apparatus as recited in claim 39, wherein the first UV source uses a mercury-doped lamp and wherein the second UV source uses an iron-doped lamp.

42. An apparatus to deposit onto a substrate and polymerize one or more UV curable inkjet inks including pigment and having a viscosity and superficial tension suitable for inkjet printing, the apparatus comprising:

one or more inkjet heads to deposit the one or more inks on the substrate;

A first UV source to irradiate the deposited inks with UV radiation relatively high in UVC radiation while the substrate is moved relative to the first UV source;

A second UV source to irradiate the deposited inks with UV radiation relatively high in one or more of UVA radiation and UVC, the irradiation by the second UV source while the substrate is moved relative to the second UV source;

A drive to move the substrate relative to the first and second UV sources; and one or more oxygen depletion units to deplete oxygen from the region between the first UV source and the laid out inks close to the substrate surface to increase the amount of UVC reaching the inks during the irradiation, the one or more oxygen depletion units to provide a blanket of relatively inert gas between the deposited inks and the first UV source, such that that inks can be relatively free of photoinitiator, each UV curable inkjet ink including:

between approximately 20% and 40% by weight of one or more monofunctional acrylates;

between approximately 35% and 55% by weight of one or more difunctional acrylates;

between approximately 5% and 15% by weight of one or more trifunctional acrylates;

between approximately 5% and 15% by weight of one or more highly reactive acrylates;

no more than approximately 5% by weight of one or more pigments; and no more than approximately 0.8% by weight of one or more photoinitiators.

43. An apparatus as recited in claim 42, wherein each UV curable inkjet ink further includes:

between approximately 0.5% and 1.5% by weight of one or more stabilizers for flow control.

44. An apparatus as recited in claim 43, wherein the stabilizers include Genorad 16.

45. An apparatus as recited in claim 42, wherein each UV curable inkjet ink further includes no more than approximately 0.3% by weight of one or more photoinitiators.

46. An apparatus as recited in claim 42, wherein the highly reactive acrylates include epoxy vinylester acrylate.

* * * * *